(12) United States Patent
Kang

(10) Patent No.: US 10,886,800 B2
(45) Date of Patent: Jan. 5, 2021

(54) DIRECT CURRENT MOTOR HAVING AN ELECTROMAGNETIC STRUCTURE FOR A VEHICLE

(71) Applicant: TAMAS CO., LTD., Gwangju (KR)

(72) Inventor: Sung Moon Kang, Gwangju (KR)

(73) Assignee: TAMAS CO., LTD., Gwangju (KR)

( * ) Notice: Subject to any disclaimer, the term of this patent is extended or adjusted under 35 U.S.C. 154(b) by 86 days.

(21) Appl. No.: 15/577,345

(22) PCT Filed: Apr. 19, 2016

(86) PCT No.: PCT/KR2016/004047
§ 371 (c)(1),
(2) Date: Nov. 28, 2017

(87) PCT Pub. No.: WO2017/007117
PCT Pub. Date: Jan. 12, 2017

(65) Prior Publication Data
US 2018/0166934 A1   Jun. 14, 2018

(30) Foreign Application Priority Data
Jul. 7, 2015  (KR) .................... 10-2015-0096521

(51) Int. Cl.
*H02K 1/24*     (2006.01)
*H02K 13/10*    (2006.01)
(Continued)

(52) U.S. Cl.
CPC .......... *H02K 1/24* (2013.01); *H02K 1/2753* (2013.01); *H02K 3/12* (2013.01); *H02K 3/52* (2013.01);
(Continued)

(58) Field of Classification Search
CPC .......... H02K 1/24; H02K 1/2753; H02K 3/12; H02K 3/28; H02K 3/52; H02K 5/145;
(Continued)

(56) References Cited

U.S. PATENT DOCUMENTS

| | | |
|---|---|---|
| 6,079,659 A | 6/2000 | Yamamura et al. |
| 2012/0086297 A1 | 4/2012 | Makino |
| 2012/0175997 A1* | 7/2012 | Lee .................. H02K 25/00 310/241 |

FOREIGN PATENT DOCUMENTS

| | | |
|---|---|---|
| JP | 11-164533 A | 6/1999 |
| JP | 2004-088915 A | 3/2004 |

(Continued)

OTHER PUBLICATIONS

Machine translation of KR-20150034504-A. (Year: 2015).*
(Continued)

*Primary Examiner* — Michael Andrews
(74) *Attorney, Agent, or Firm* — Revolution IP, PLLC

(57) ABSTRACT

The present invention relates to a direct current motor for a vehicle, the motor having a novel electromagnetic structure and exhibiting excellent driving efficiency. The direct current motor comprises: a cover assembly; a yoke assembly that has a housing coupled with the cover assembly and a plurality of excitation poles arranged within the housing; an armature assembly that includes an armature core having a plurality of pole teeth around which coils interacting with the excitation poles are wound and a commutator having, on the armature core, the same number of commutator films as the excitation poles; and a brush disposed inside the cover assembly and selectively making contact with the commutator as the armature assembly rotates, wherein the excitation poles are provided such that three N-poles and three S-poles are alternately arranged, and 13 pole teeth and 13
(Continued)

commutator films are radially formed with a predetermined angle therebetween.

1 Claim, 5 Drawing Sheets

(51) Int. Cl.

| | | |
|---|---|---|
| *H02K 3/52* | (2006.01) | |
| *H02K 1/27* | (2006.01) | |
| *H02K 3/12* | (2006.01) | |
| *H02K 5/14* | (2006.01) | |
| *H02K 15/06* | (2006.01) | |
| *H02K 5/22* | (2006.01) | |
| *H02K 3/28* | (2006.01) | |

(52) U.S. Cl.
 CPC .............. *H02K 5/145* (2013.01); *H02K 13/10* (2013.01); *H02K 15/067* (2013.01); *H02K 3/28* (2013.01); *H02K 5/225* (2013.01); *H02K 2213/03* (2013.01)

(58) Field of Classification Search
 CPC ........ H02K 5/225; H02K 13/00; H02K 13/10; H02K 2213/03
 USPC ................. 310/89, 219, 238, 239, 240, 241
 See application file for complete search history.

(56) References Cited

FOREIGN PATENT DOCUMENTS

| | | | |
|---|---|---|---|
| JP | 2010-279163 A | | 12/2010 |
| KR | 10-1994-0020643 A | | 9/1994 |
| KR | 10-1200505 B1 | | 11/2012 |
| KR | 10-2012-0140597 A | | 12/2012 |
| KR | 20120140597 A | * | 12/2012 |
| KR | 10-2015-0034504 A | | 4/2015 |
| KR | 20150034504 A | * | 4/2015 |

OTHER PUBLICATIONS

Machine translation of KR-20120140597-A. (Year: 2012).*
International Search Report for PCT/KR2016/004047 dated Jul. 18, 2016 from Korean Intellectual Property Office.

* cited by examiner

[Fig. 1]
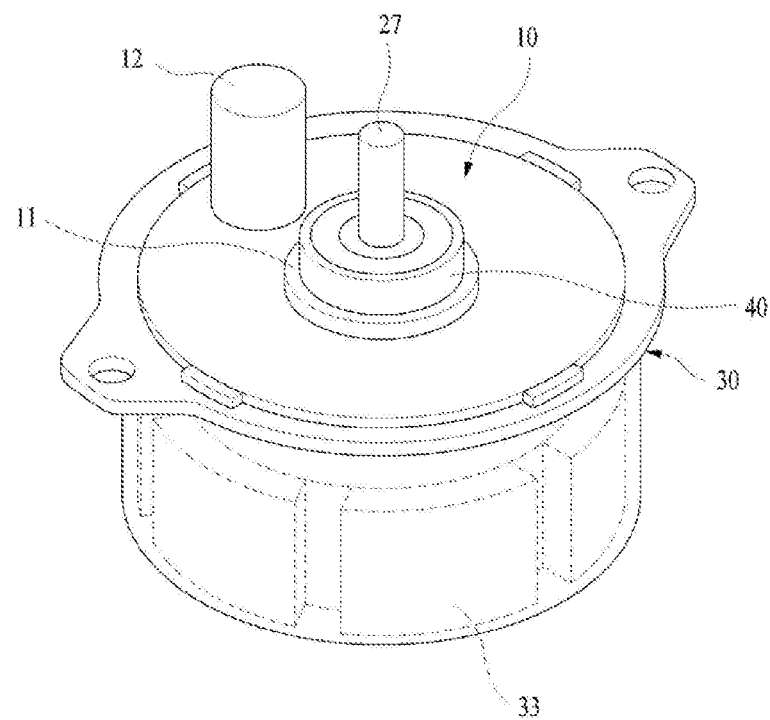

[Fig. 2]
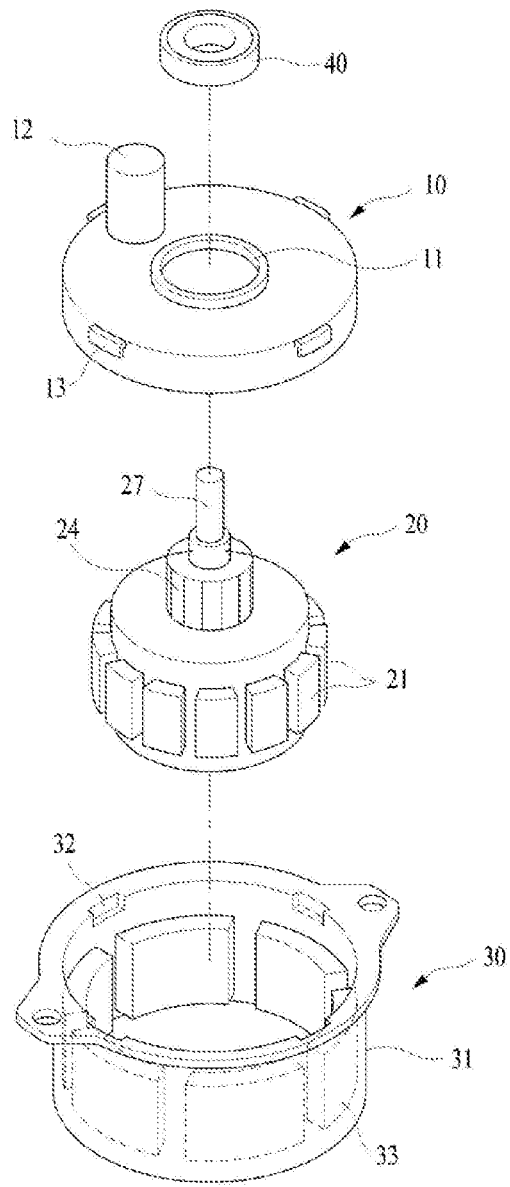

[Fig. 3]
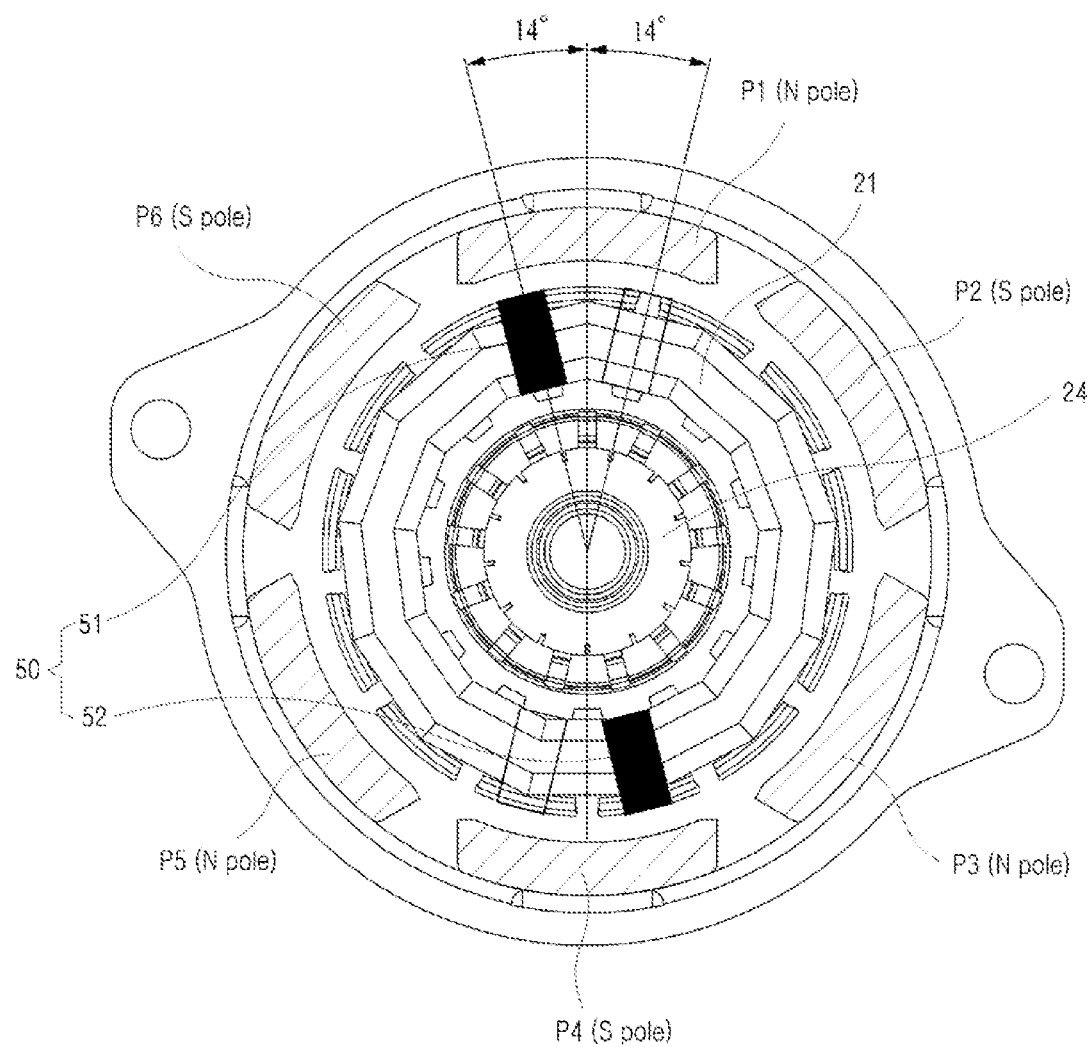

[Fig. 4]
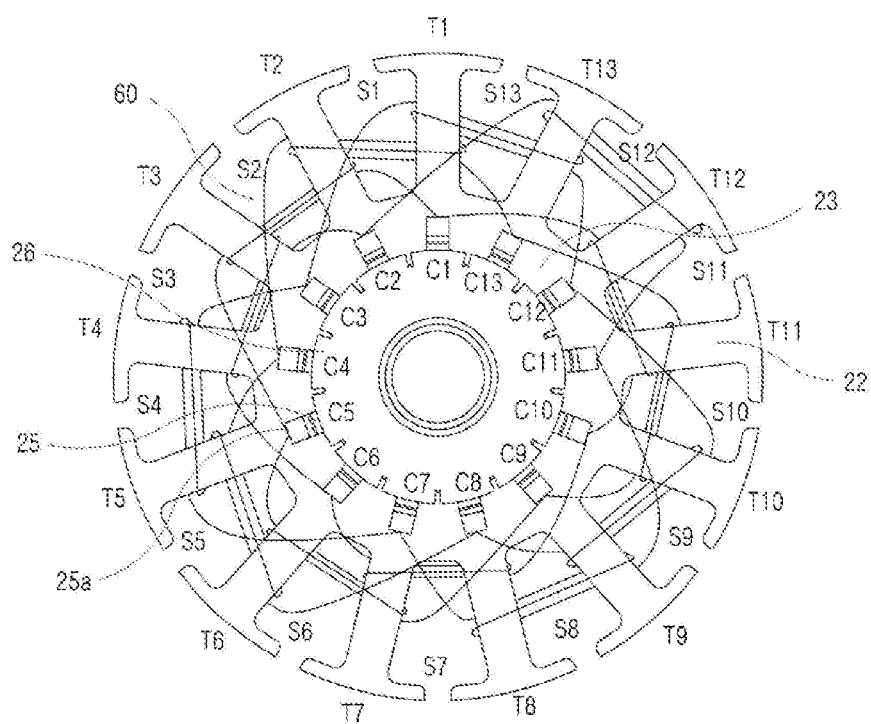

[Fig. 5]
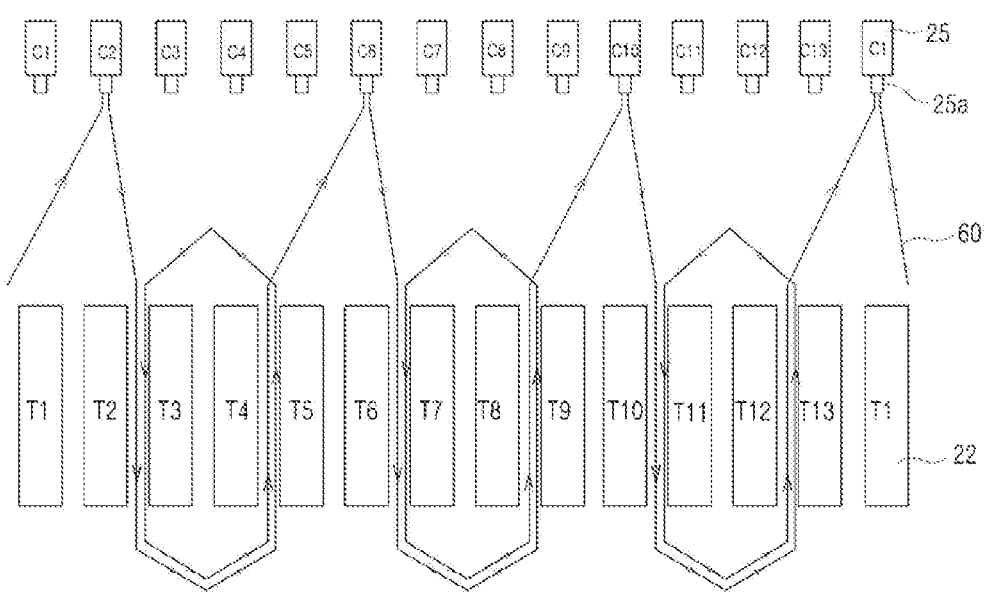

DIRECT CURRENT MOTOR HAVING AN ELECTROMAGNETIC STRUCTURE FOR A VEHICLE

TECHNICAL FIELD

The present invention relates to a direct current motor for a vehicle. More specifically, the present invention relates to a direct current motor for a vehicle, the motor having a novel electromagnetic structure and exhibiting excellent driving efficiency.

BACKGROUND ART

In general, a direct current motor is configured by arranging an armature to rotate freely inside a yoke arranged with a magnet in the inner circumference. The armature has a plurality of pole teeth radially extended from the rotation axis, and a plurality of slots are longitudinally formed in the axial direction for armature coil winding between a pole tooth and another neighboring pole tooth.

A plurality of coils are wound around the slot at predetermined intervals, and each coil is connected to a commutator film of a commutator mounted on a rotation axis isolated from the armature at a predetermined distance to carry the current. Also, each commutator film is connected to carry the current to the brush.

Therefore, when the current is provided to a commutator from the brush, an electric field is formed in each coil, and the rotation axis mounted with the armature and the commutator rotates and a driving force is generated by the interaction between the electric field created as above and the magnet attached to the yoke.

Such direct current motors can control speed with a broad and high accuracy, and thus may be used for an anti-lock brake system (ABS) which is used for brake devices for vehicles.

In particular, motors of various structures are under research and development in order to minimize the motor and maximize driving efficiency in response to the demand of the market of direct current motors for vehicles.

For example, with regard to a direct current motor, Korean Patent No. 10-1200505 discloses that the commutator of a coil wound around an armature core has 20 commutator films, and the armature coir has the same number of slots as the commutator film. The number of commutator films of the conventional direct current motor configured as above is 20, which is a multiple of the magnet pole numbers (which is 4). Therefore, the core slot may be stuck between the permanent magnets while driving the motor, thereby badly affecting the cogging torque, and accordingly the efficiency of the motor would drop.

In this regard, in light of the above situation, the present inventors suggest an improved direct current motor for a vehicle which may have higher efficiency while reducing the size of the motor.

DETAILED DESCRIPTION OF INVENTION

Technical Task

It is an object of the present invention to provide a direct current motor for a vehicle which maximizes the efficiency of the motor by applying a new winding pattern while changing the structure of the brush.

It is another object of the present invention to provide a direct current motor for a vehicle which minimizes the motor and has high efficiency as compared to a motor of the same size by forming the excitation pole to be 6 poles, thereby reducing the thickness of the yoke assembly.

Means for Solving the Technical Task

The direct current motor for a vehicle according to the present invention comprises: a cover assembly; a yoke assembly that has a housing coupled with the cover assembly and a plurality of excitation poles arranged within the housing; an armature assembly that includes an armature core having a plurality of pole teeth around which coils interacting with the excitation poles are wound and a commutator having, on the armature core, the same number of commutator films as the excitation poles; and a brush disposed inside the cover assembly and selectively making contact with the commutator as the armature assembly rotates, wherein the excitation poles are provided such that three N-poles and three S-poles are alternately arranged, and 13 pole teeth and 13 commutator films are radially formed with a predetermined angle therebetween.

In the present invention, the brush may comprise a pair of a first brush and a second brush, and the first brush and the second brush may be formed with an angle of 180° with respect to each other and may be fixedly installed in a state rotated at an angle of 14° with respect to the axis connecting the excitation poles facing each other.

In the present invention, the coil may start from a first commutator film, wind around a first pole tooth and a second pole tooth adjacent each other at the same time, and then be connected to a second commutator film.

In the present invention, the first commutator film may be a commutator film disposed on a first pole tooth in the left direction of the first pole tooth, and the second commutator film may be a commutator film disposed on a second pole tooth in the right direction of the second pole tooth.

Effect of the Invention

According to the direct current motor for a vehicle according to the present invention, the size of the motor may be minimized and the output and efficiency may be maximized by applying an improved winding pattern when implementing a 6-pole motor, having a pair of brushes arranged in 180° and allowing the motor to conduct a normal rotation in a state having an angle of 14° with respect to the center part of the excitation pole.

BRIEF DESCRIPTION OF DRAWINGS

FIG. 1 is a perspective view of the motor according to an embodiment of the present invention;

FIG. 2 is an exploded perspective view of the motor of FIG. 1;

FIG. 3 is a plan view with a cover assembly removed from the motor of FIG. 1;

FIG. 4 is a drawing illustrating the appearance of a coil wound around the armature assembly according to the present invention; and FIG. 5 is a drawing illustrating a method for winding a coil according to an embodiment of the present invention.

Hereinafter, preferable embodiments of the motor according to the present invention are explained in detail with reference to the attached drawings.

BEST MODE FOR CARRYING OUT THE INVENTION

FIG. 1 is a perspective view of the motor according to the present invention. FIG. 2 is an exploded perspective view of the motor of FIG. 1. FIG. 3 is a plan view with a cover assembly removed from the motor of FIG. 1. FIG. 4 is a drawing illustrating the appearance of a coil wound around the armature assembly according to the present invention.

Referring to FIGS. 1 to 4, the motor according to an embodiment of the present invention comprises a cover assembly 10, an armature assembly 20 and a yoke assembly 30.

The yoke assembly 30 comprises a housing 31 coupled with the cover assembly 10, and a plurality of excitation poles arranged within the housing 31.

The housing 31 has a cylindrical shape having its upper part open, and a coupling groove 32 is formed in the upper part. The coupling groove 32 is coupled in correspondence to a protrusion piece 13 provided in the cover assembly 10.

The excitation pole 33 comprises three pairs of 6-pole magnets, i.e., a first N pole (P1), a first S pole (P2), a second N pole (P3), a second S pole (P4), a third N pole (P5), and a third S pole (P6), which are arranged in order along the inner surface of the housing 31 maintaining a predetermined interval. As such, by configuring a 6-pole motor, as compared to the case of the conventional 4-pole motor, the present invention may have an effect of reducing the thickness of the yoke. For example, when forming a 4-pole motor having a housing thickness of 2.0T into a 6-pole motor, the thickness of the housing becomes 1.6T, and the thickness may be reduced by about 0.4T, leading to the miniaturizing of the motor. Further, there may be an effect of saving manufacturing costs.

The armature assembly 20 comprises an armature core 22 having a plurality of the pole teeth 22 around which coils interacting with the plurality of excitation poles 33 are wound, and a commutator 24 having the same number of commutator films 25 disposed on the armature core 21 as the pole teeth 22.

A rotation axis 27 penetrates through the center of the armature core 21 and the commutator 24, and when the motor is activated, the armature core 21 and the commutator 24 rotate together with the rotation axis 27. At this time, a bearing 40 for rotatably supporting the rotation axis 27 may be provided on the rotation axis 27.

As illustrated in FIG. 4, the armature core 21 comprises a base 23 and a pole tooth 22 formed extending radially from the base 23. There may be a total of 13 pole teeth 22, and a $2^{nd}$ pole tooth (T2), a $3^{rd}$ pole tooth (T3), a $4^{th}$ pole tooth (T4), a $5^{th}$ pole tooth (T5), a $6^{th}$ pole tooth (T6), a $7^{th}$ pole tooth (T7), an $8^{th}$ pole tooth (T8), a $9^{th}$ pole tooth (T9), a $10^{th}$ pole tooth (T10), an $11^{th}$ pole tooth (T11), a $12^{th}$ pole tooth (T12) and a $13^{th}$ pole tooth (T13) are formed at predetermined intervals in the counterclockwise direction with respect to the $1^{st}$ pole tooth (T1).

A coil 60 is wound around each pole tooth 22, and when a current is applied to the coil 60, a torque is generated through the interaction with the excitation pole 33. A detailed method for winding in relation to the above will be explained in the following with reference to FIG. 5.

Meanwhile, one slot is formed between each of the two neighboring pole teeth 22 among the pole teeth 22. That is, a $1^{st}$ slot (S1) is formed between a $1^{st}$ pole tooth (T1) and a $2^{nd}$ pole tooth (T2), and a $2^{nd}$ slot (S2) is formed between the $2^{nd}$ pole tooth (T2) and a $3^{rd}$ pole tooth (T3). Likewise, a $3^{rd}$ slot (S3), a $4^{th}$ slot (S4), a $5^{th}$ slot (S5), a $6^{th}$ slot (S6), a $7^{th}$ slot (S7), an $8^{th}$ slot (S8), a $9^{th}$ slot (S9), a $10^{th}$ slot (S10), an $11^{th}$ slot (S11), a $12^{th}$ slot (S12) and a $13^{th}$ slot (S13) are formed respectively between the two neighboring pole teeth 22.

The commutator 24 comprises a commutator film 25 and a commutator main body 26, and may be arranged on the armature core 21. The commutator film 25 may be configured in the same number, i.e., 13, as the pole tooth 22. In particular, with respect to a $1^{st}$ commutator film (C1) disposed on the first pole tooth (T1), in the same manner as the pole tooth (22), a $2^{nd}$ commutator film (C2), a $3^{rd}$ commutator film (C3), a $4^{th}$ commutator film (C4), a $5^{th}$ commutator film (C5), a $6^{th}$ commutator film (C6), a $7^{th}$ commutator film (C7), an $8^{th}$ commutator film (C8), a $9^{th}$ commutator film (C9), a $10^{th}$ commutator film (C10), an $11^{th}$ commutator film (C11), a $12^{th}$ commutator film (C12) and a $13^{th}$ commutator film (C13) are formed at predetermined intervals in the counterclockwise direction.

The commutator films 25 are electrically insulated, and a fastening piece 25a allowing the coil 60 to be stuck is formed at one end of the commutator films 25.

The embodiments of the present invention explained in the above exemplify the case of 6 excitation poles 33, 13 pole teeth 22 and 13 commutator film 25, but are not limited thereto, and the number of the excitation pole 33, pole teeth 22 and commutator film 25 may vary as needed.

The cover assembly 10 is disposed at the uppermost part of the motor, so as to open and close the upper part of the yoke assembly 30. To this end, a protrusion piece 13 may be formed in an edge of the cover assembly 10 for coupling with the housing 31 of the yoke assembly, and the protrusion piece 13 is coupled in correspondence to the coupling groove 32 of the housing.

Also, the cover assembly 10 may be formed with a bearing insertion hole 11 inserted with the bearing 40 in the middle part, and may be provided with a wire connecting pipe 12 with a wire penetrating therethrough in order to receive power from the outside.

A brush 50 is fixedly installed inside the cover assembly 10. The brush 50 selectively makes contact with the commutator 24 as the armature assembly 20 rotates, and the current may flow to the coil 60 through a commutator 24 in contact by being connected to the wire.

The brush 50 comprises a pair of a first brush 51 and a second brush 52, and the first brush 51 and the second brush 52 are arranged forming an angle of 180° with respect to each other.

In particular, in the present invention, as illustrated in FIG. 3, the brush 50 may be fixedly installed in a state rotated at an angle of 14° in the clockwise direction or counterclockwise direction with respect to the axis connecting a pair of excitation poles (e.g., P1 and P4) facing each other. The efficiency of the motor is the highest at that time.

FIG. 5 is a drawing illustrating a method for winding coil according to the present invention. Referring to FIG. 5, a process of the coil 60 winding around a plurality of pole teeth 22 and a process of the coil 60 being connected to the commutator films 25 are explained in detail.

First, the coil 60 starts from the $2^{nd}$ commutator film (C2), winds around a $3^{rd}$ pole tooth (T3) and a $4^{th}$ pole tooth (T4) at the same time, and is then connected to a $6^{th}$ commutator film (C6).

In particular, the coil 60 that comes out from a $2^{nd}$ commutator film (C2) enters a $2^{nd}$ slot (S2), passes through the lower part of a third pole tooth (T3) and a $4^{th}$ pole tooth (T4), and comes out of a $4^{th}$ slot (S4). Also, it passes through the upper part of a $3^{rd}$ pole tooth (T3) and a $4^{th}$ pole tooth (T4), enters the $2^{nd}$ slot (S2) again as above, and comes out of a $4^{th}$ slot (S4). After repeating this process several times as much as the number of coils wound, the coil 60 is connected to a $6^{th}$ commutator film (C6). Here, the process of the coil 60 winding around two adjacent pole teeth may be applied in the same manner in the following.

Next, the coil 60 passing through the $6^{th}$ commutator film (C6) winds around the $7^{th}$ pole tooth (T7) and an $8^{th}$ pole tooth (T8) at the same time, and is then connected to a $10^{th}$ commutator film (C10).

Next, the coil 60 passing through the $10^{th}$ commutator film (C10) winds around the $11^{th}$ pole tooth (T11) and a $12^{th}$ pole tooth (T12) at the same time, and is then connected to a $1^{st}$ commutator film (C1).

That is, when winding the coil 60 in the above pattern, a commutator film 25 is wound around the coil 60 in the order of a $2^{nd}$ commutator film (C2), a $6^{th}$ commutator film (C6), a $10^{th}$ commutator film (C10), a $1^{st}$ commutator film (C1), a $5^{th}$ commutator film (C5), a $9^{th}$ commutator film (C9), a $13^{th}$ commutator film (C13), a $4^{th}$ commutator film (C4), an $8^{th}$ commutator film (C8), a $12^{th}$ commutator film (C12), a $3^{rd}$ commutator film (C3), a $7^{th}$ commutator film (C7), and an $11^{th}$ commutator film (C11).

At this time, two adjacent pole teeth 22 winding around the coil 60 before each of the commutator films 25 are connected may be selected in the order of a $3^{rd}$ pole tooth and a $4^{th}$ pole tooth (T3, T4), a $7^{th}$ pole tooth and an $8^{th}$ pole tooth (T7, T8), an $11^{th}$ pole tooth and a $12^{th}$ pole tooth (T11, T12), a $2^{nd}$ pole tooth and a $3^{rd}$ pole tooth (T2, T3), a $6^{th}$ pole tooth and a $7^{th}$ pole tooth (T6, T7), a $10^{th}$ pole tooth and an $11^{th}$ pole tooth (T10, T11), a $1^{st}$ pole tooth and a $2^{nd}$ pole tooth (T1, T2), a $5^{th}$ pole tooth and a $6^{th}$ pole tooth (T5, T6), a $9^{th}$ pole tooth and a $10^{th}$ pole tooth (T9, T10), a $13^{th}$ pole tooth and a $1^{st}$ pole tooth (T13, T1), a $4^{th}$ pole tooth and a $5^{th}$ pole tooth (T4, T5), an $8^{th}$ pole tooth and a $12^{th}$ pole tooth (T8, T12), and a $12^{th}$ pole tooth and a $13^{th}$ pole tooth (T12, T13).

In other words, the coil 60 starting from the $n^{th}$ commutator film ($C_n$) repeats entering into the $k^{th}$ slot ($S_k$) and coming out from the $(k+2)^{th}$ slot ($S_{k+2}$), and winding around the $(m+1)^{th}$ pole tooth ($T_{m+1}$) and the $(m+2)^{th}$ pole tooth ($T_{m+2}$) at the same time. Then, the coil 60 is connected to an $(n+4)^{th}$ ($C_{n+4}$) commutator film.

Here, n, k and m are natural numbers having a value of 1 to 13 according to the number of commutator film 25, slot 28 and pole tooth 22, and the values of (k+2), (m+1), (m+2) and (n+4) are the remainder divided by 13 in case the values exceed 13. Meanwhile, in an embodiment of the present invention, the commutator film and the pole teeth are disposed up and down in correspondence to each other, and accordingly n, k and m may be the same value.

FIG. 4 illustrates the appearance of a coil wound around the armature assembly according to the above winding method. In the present invention, the efficiency may be maximized in a 6-pole motor by applying this winding method and the structure of the brush explained in the above.

Embodiments in the detailed description of the present invention were presented to help understand the present invention, not to limit the scope of the present invention. The scope of the present invention is defined by the appended claims, and it should be interpreted that simple modifications or changes within the scope of the claims fall within the scope of the present invention.

What is claimed is:

1. A direct current motor for a vehicle, the motor comprising:
   a cover assembly;
   a yoke assembly that has a housing coupled with the cover assembly and a plurality of excitation poles arranged within the housing;
   an armature assembly that includes an armature core having 13 pole teeth around which coil interacting with the excitation poles is wound and a commutator having, on the armature core, 13 commutator films; and
   a brush disposed inside the cover assembly and selectively making contact with the commutator as the armature assembly rotates,
   wherein the brush comprises a pair of a first brush and a second brush,
      the first brush and the second brush
         arranged in a straight line and formed with an angle of 180° with respect to each other, and
         fixedly installed in a state rotated at an angle of 14° in a clockwise direction or a counterclockwise direction with respect to an axis, the axis being defined as a line connecting P1 and P4 of the excitation poles, and passing C1 and between C7 and C8 of the 13 commutator films,
   wherein the excitation poles having 6-pole magnets are provided such that three N-poles and three S-poles are alternately arranged, and the 13 pole teeth and the 13 commutator films are radially formed with a predetermined angle therebetween,
   wherein the 13 pole teeth are formed at predetermined intervals in the counterclockwise direction with respect to a $1^{st}$ pole tooth,
   wherein, on top of the 13 pole teeth, the 13 commutator films are formed at predetermined intervals in the counterclockwise direction,
   wherein each of the 13 commutator films is formed in the same direction as each of the 13 pole teeth so that each of the 13 commutator films is in alignment with each of the 13 pole teeth,
   wherein the coil is configured to
      pass through a $n^{th}$ commutator film, repeat entering into a $k^{th}$ slot and coming out from a $(k+2)^{th}$ slot and winding around a $(m+1)^{th}$ pole tooth and a $(m+2)^{th}$ pole tooth based on the number of coil wound, and connect with a $(n+4)^{th}$ commutator film,
      wherein the n, the k and the m are natural numbers of 1 to 13, and values of (k+2), (m+1), (m+2) and (n+4) are the remainder divided by 13 in case the values exceed 13.

* * * * *